(12) United States Patent
Stirbu

(10) Patent No.: US 9,275,142 B2
(45) Date of Patent: Mar. 1, 2016

(54) METHOD AND APPARATUS FOR MULTI-BROWSER WEB-BASED APPLICATIONS

(75) Inventor: Vlad Stirbu, Tampere (FI)

(73) Assignee: Nokia Technologies Oy, Espoo (FI)

( * ) Notice: Subject to any disclaimer, the term of this patent is extended or adjusted under 35 U.S.C. 154(b) by 946 days.

(21) Appl. No.: 13/408,427

(22) Filed: Feb. 29, 2012

(65) Prior Publication Data

US 2013/0227010 A1    Aug. 29, 2013

(51) Int. Cl.
  *G06F 15/16*    (2006.01)
  *G06F 17/30*    (2006.01)
  *H04M 1/725*    (2006.01)

(52) U.S. Cl.
  CPC .... *G06F 17/30861* (2013.01); *G06F 17/30905* (2013.01); *H04M 1/72561* (2013.01); *H04M 1/72527* (2013.01)

(58) Field of Classification Search
  USPC .......................................................... 709/204
  See application file for complete search history.

(56) References Cited

U.S. PATENT DOCUMENTS

| | | | |
|---|---|---|---|
| 8,751,958 B2 * | 6/2014 | Mudge et al. ................. | 715/790 |
| 2006/0259575 A1 | 11/2006 | Upendran et al. | |
| 2010/0138780 A1 | 6/2010 | Marano et al. | |
| 2011/0066971 A1 | 3/2011 | Forutanpour et al. | |
| 2011/0131520 A1 | 6/2011 | Al-Shaykh et al. | |
| 2011/0191431 A1 | 8/2011 | Noguchi | |

FOREIGN PATENT DOCUMENTS

WO    WO-2011/074936 A1    6/2011

OTHER PUBLICATIONS

Stirbu, V. and Belimpasakis, P.; "Experiences Building a Multi-Display Mobile Application for Exploring Mirror Worlds"; 5th International Conference and Exhibition on Next Generation Mobile Applications, Services and Technologies (NGMAST'11); Cardiff, Wales, United Kingdom, Sep. 2011.
ScreenRecycler; Downloaded at http://www.screenrecycler.com/ScreenRecycler.html on Jun. 20, 2012; 1 page.
International Search Report and Written Opinion for Application No. PCT/FI2013/050122, dated Apr. 22, 2013.

\* cited by examiner

*Primary Examiner* — Tu Nguyen
(74) *Attorney, Agent, or Firm* — Alston & Bird LLP

(57) ABSTRACT

Various methods are described for expanding the display of a web application across multiple devices. One example method may comprise receiving an indication of content associated with a main frame of a web application. The method may further comprise displaying of the content associated with the main frame. Furthermore, the method may comprise searching for one or more external devices. Each of the one or more external devices may comprise a display for rendering content associated with a respective expanded frame of the web application. The method of this example embodiment may further comprise establishing a connection with the one or more external devices. Furthermore, the method may comprise providing for transmission to each of the one or more external devices of an indication of the content associated with the respective expanded frame. Similar and related example methods, example apparatuses, and example computer program products are also provided.

28 Claims, 7 Drawing Sheets

METHOD AND APPARATUS FOR MULTI-BROWSER WEB-BASED APPLICATIONS

TECHNICAL FIELD

Embodiments of the present invention relate generally to communication technology, and, more particularly, relate to a method and apparatus for expanding the display of a web application across multiple devices.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to improve the user experience associated with displaying the information being transferred. For example, the information provided to a user may be provided in the form of a web application. In some instances, the information provided by the web application may be too large to be displayed on a single device. As a result, there is a need to provide solutions for expanding the display of the web application to a user. Requiring the user to purchase and install additional specialty hardware or software to implement the solution, however, is unfavorable to the user.

Accordingly, it may be desirable to provide systems, methods, apparatuses, and computer program products for expanding the display of a web application across multiple devices without requiring the installation of any additional hardware or software to the devices.

SUMMARY

Methods, apparatuses, and computer program products are herein provided for expanding the display of a web application across multiple devices. Systems, methods, apparatuses, and computer program products in accordance with various embodiments may provide several advantages to computing devices, computing device users, and network providers. Some example embodiments advantageously enable a terminal device to connect to other external terminal devices onto which the display may be expanded. In some instances, the external terminal devices may not require the installation of additional hardware or software for expanding the display. For example, various embodiments advantageously enable an external terminal device to use its currently existing display as well as its currently installed web browser application to display the expanded portion of the web application.

Furthermore, various advantageous embodiments allow a developer to create the web application such that they are pre-configured to be displayed across multiple devices. For example, the developer may design the web application to divide the display across multiple frames, such that each of the main device and the one or more external devices may each display a particular frame of the web application. Various embodiments may further advantageously allow a user to manipulate the display on any of the connected devices (e.g., main device or external device) and have the display on the remaining devices automatically manipulated as well. For example, a user may manipulate a panoramic image displayed on the main device by scrolling the panoramic image, and as a result the portions of the panoramic image displayed on the connected external devices may be similarly scrolled to reflect the update to the display without requiring further user input on the external devices.

In an example embodiment, a method is provided, which may comprise receiving an indication of content associated with a main frame of a web application. The method of this example embodiment may further comprise providing for display of the content associated with the main frame. The method of this example embodiment may also comprise searching for one or more external devices. Each of the one or more external devices may comprise a display for rendering content associated with a respective expanded frame of the web application. The method of this example embodiment may further comprise establishing a connection with the one or more external devices. Additionally, the method of this example embodiment may comprise providing for transmission to each of the one or more external devices of an indication of the content associated with the respective expanded frame.

In another example embodiment, an apparatus comprising at least one processor and at least one memory storing computer program code is provided. The at least one memory and stored computer program code may be configured, with the at least one processor, to cause the apparatus of this example embodiment to at least receive an indication of content associated with a main frame of a web application. The at least one memory and stored computer program code may be configured, with the at least one processor, to further cause the apparatus of this example embodiment to provide for display of the content associated with the main frame. Furthermore, the at least one memory and stored computer program code may be configured, with the at least one processor, to cause the apparatus of this example embodiment to search for one or more external devices. Each of the one or more external devices may comprise a display for rendering content associated with a respective expanded frame of the web application. The at least one memory and stored computer program code may be configured, with the at least one processor, to further cause the apparatus of this example embodiment to establish a connection with the one or more external devices. Additionally, the at least one memory and stored computer program code may be configured, with the at least one processor, to cause the apparatus of this example embodiment to provide for transmission to each of the one or more external devices of an indication of the content associated with the respective expanded frame.

In another example embodiment, a computer program product is provided. The computer program product of this example embodiment may comprise at least one non-transitory computer-readable storage medium having computer program code stored thereon, wherein the computer program code, when executed by an apparatus (e.g., one or more processors), causes the apparatus to perform various functionalities. In this regard, the program code may cause the apparatus to receive an indication of content associated with a main frame of a web application; provide for display of the content associated with the main frame; search for one or more external devices; and provide for transmission to each of the one or more external devices of an indication of the content associated with the respective expanded frame. In this example embodiment, each of the one or more external devices may comprise a display for rendering content associated with a respective expanded frame of the web application; establish a connection with the one or more external devices.

In another example embodiment, an apparatus is provided, which may comprise means for receiving an indication of content associated with a main frame of a web application. The apparatus of this example embodiment may further comprise means for providing for display of the content associated with the main frame. Furthermore, the apparatus of this example embodiment may comprise means for searching for one or more external devices. Each of the one or more external devices may comprise a display for rendering content associated with a respective expanded frame of the web application. The apparatus of this example embodiment may further comprise means for establishing a connection with the one or more external devices. Additionally, the apparatus of this example embodiment may comprise means for providing for transmission to each of the one or more external devices of an indication of the content associated with the respective expanded frame.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described some example embodiments of the invention in general terms, reference will now be made to the accompanying drawings, which are not necessarily drawn to scale, and wherein:

DETAILED DESCRIPTION

Figure 1:
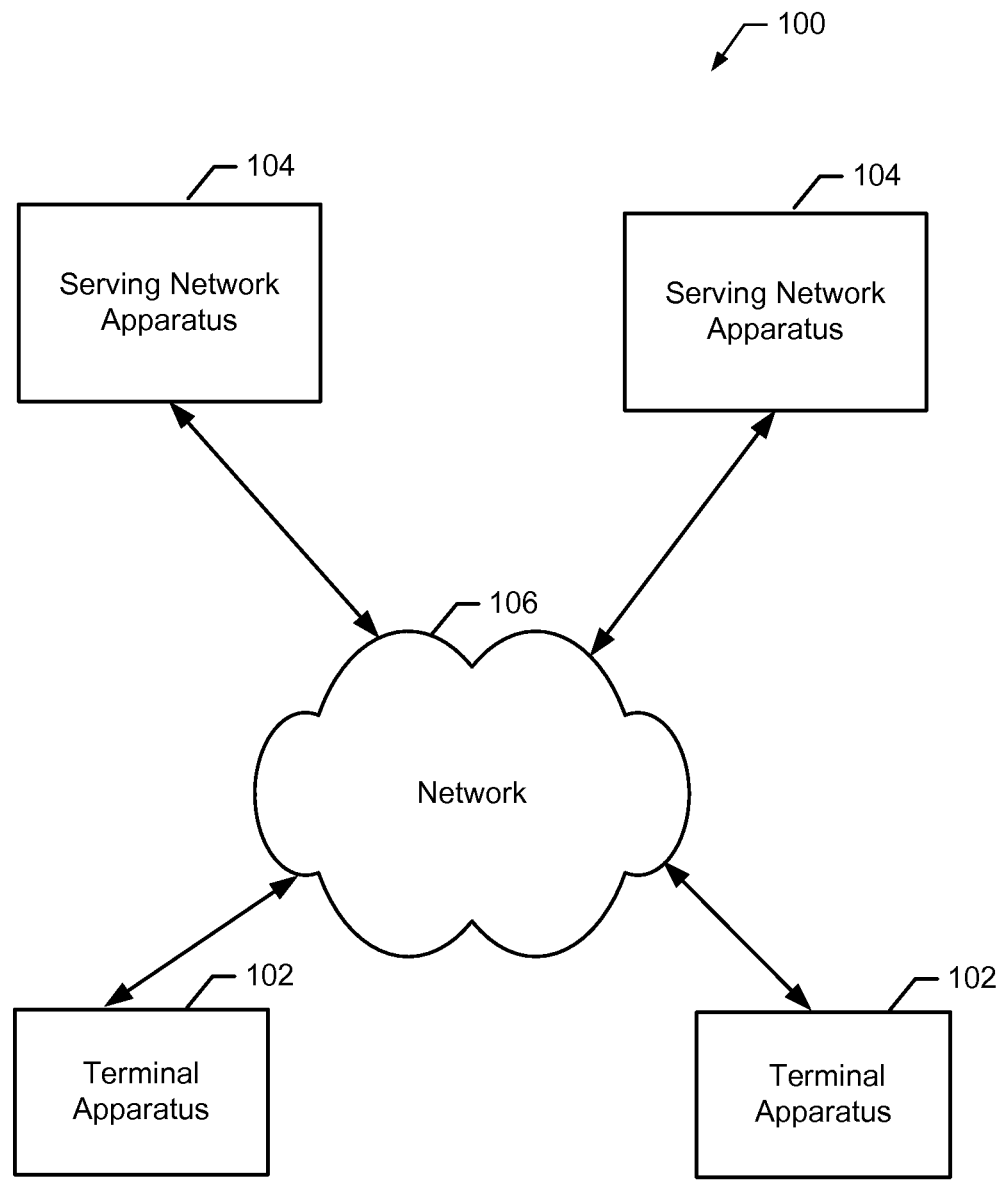
FIG. 1 illustrates a system for expanding the display of a web application across multiple devices according to some example embodiments of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

The terms "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term 'circuitry' refers to all of the following: (a) hardware-only circuit implementations (such as implementations in only analog and/or digital circuitry); (b) to combinations of circuits and computer program product(s) comprising software (and/or firmware instructions stored on one or more computer readable memories), such as (as applicable): (i) to a combination of processor(s) or (ii) to portions of processor(s)/software (including digital signal processor(s)), software, and memory(ies) that work together to cause an apparatus, such as a mobile phone or server, to perform various functions described herein); and (c) to circuits, such as, for example, a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, other network device, and/or other computing device.

Referring now to FIG. 1, FIG. 1 illustrates a block diagram of a system 100 for expanding the display of a web application across multiple devices according to an example embodiment. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for expanding the display of a web application across multiple devices, numerous other configurations may also be used to implement embodiments of the present invention.

The system 100 may include one or more terminal apparatuses 102 and one or more serving network apparatuses 104. The system 100 may further comprise a network 106. The network 106 may comprise one or more wireline networks, one or more wireless networks, or some combination thereof. The network 106 may, for example, comprise a serving network (e.g., a serving cellular network) for one or more terminal apparatuses 102. The network 106 may comprise, in certain embodiments, one or more of the terminal apparatuses 102 and serving network apparatuses 104 themselves. According to example embodiments, the network 106 may comprise the Internet. The network 106 may comprise, in some embodiments, a Content Delivery Network (CDN), which may also be referred to as a Content Distribution Network. In various embodiments, the network 106 may comprise a wired access link connecting one or more terminal apparatuses 102 to the rest of the network 106 using, for example, Digital Subscriber Line (DSL) technology. In some embodiments, the network 106 may comprise a public land mobile network (for example, a cellular network), such as may be implemented by a network operator (for example, a cellular access provider). The network 106 may operate in accordance with universal terrestrial radio access network (UTRAN) standards, evolved UTRAN (E-UTRAN) standards, current and future implementations of Third Generation Partnership Project (3GPP) LTE (also referred to as LTE-A) standards, current and future implementations of International Telecommunications Union (ITU) International Mobile Telecommunications-Advanced (IMT-A) systems standards, and/or the like. It will be appreciated, however, that where references herein are made to a network standard and/or terminology particular to a network standard, the references are provided merely by way of example and not by way of limitation.

According to various embodiments, one or more terminal apparatuses 102 may be configured to connect directly with one or more serving network apparatuses 104 via, for example, an air interface without routing communications via one or more elements of the network 106. Alternatively, one or more of the terminal apparatuses 102 may be configured to communicate with one or more of the serving network apparatuses 104 over the network 106. In this regard, the serving network apparatuses 104 may comprise one or more nodes of the network 106. For example, in some example embodiments, the serving network apparatuses 104 may be at least partially embodied on one or more computing devices that comprise an element of a radio access network (RAN) portion of the network 106. In this regard, the serving network apparatuses 104 may, for example, be at least partially embodied on an access point of the network 106 (for example, a macrocell, microcell, picocell, femtocell, closed subscriber group (CSG) cell, base station, base transceiver station (BTS), node B, evolved node B, access point (AP), group owner, mesh station (STA), mesh point, and/or the like), which may, for example be configured to provide access to the network 106 (e.g., via a radio uplink) to one or more of the terminal apparatuses 102. Accordingly, each of the serving network apparatuses 104 may comprise a network node or a plurality of network nodes collectively configured to perform one or more operations attributed to the serving network apparatus 104 as described with respect to various example embodiments disclosed herein.

Figure 7:
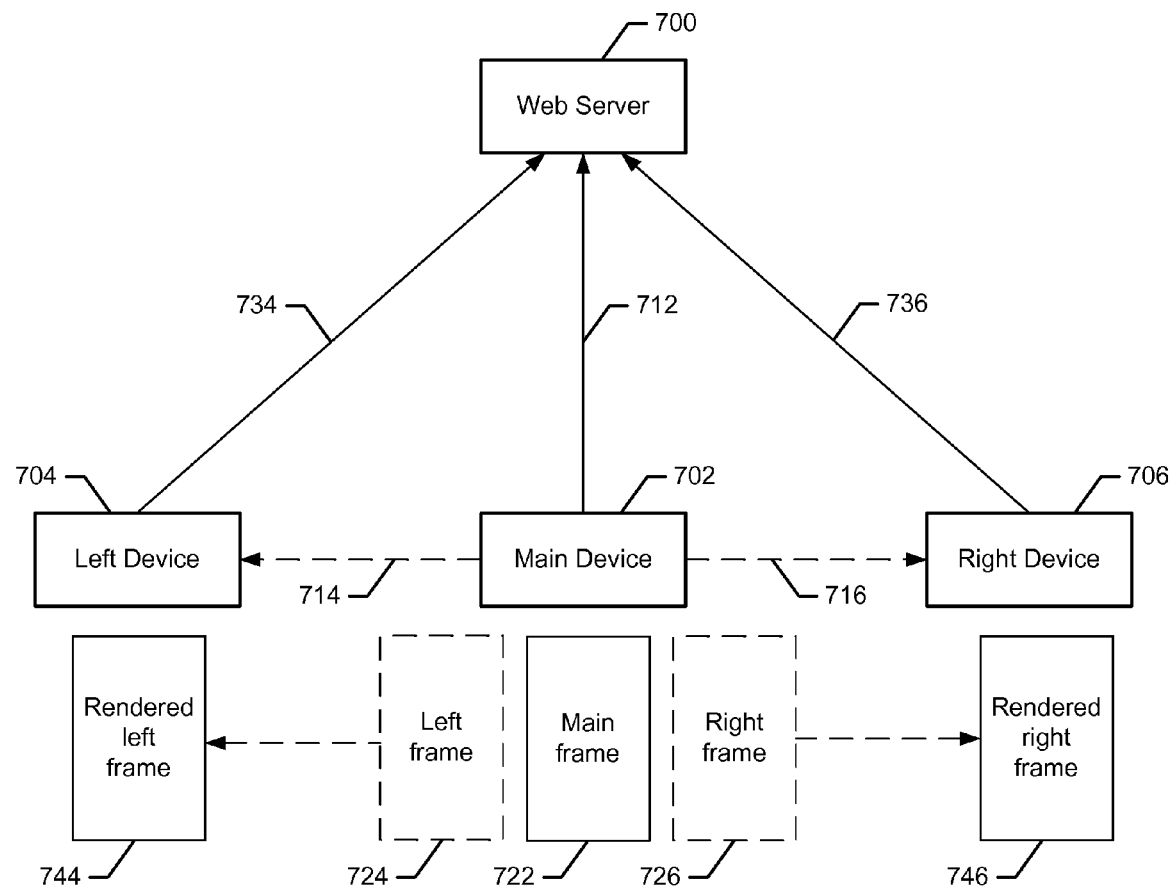
FIG. 7 illustrates an example configuration according to an example embodiment for expanding the display of a web application across multiple devices.

According to various embodiments, the system 100 may be configured according to an architecture for providing for distribution of web content. In this regard, a serving network apparatus 104 may be configured to operate as a web server, and a terminal apparatus 102 may be configured to operate as a client accessing the web server. In other embodiments, a terminal apparatus 102 may be configured to operate as both a web server and a client accessing a web server. In these embodiments, the terminal apparatus 102 may be configured to perform the functionality discussed below with respect to both the terminal apparatus 102 and the serving network apparatus 104. According to some embodiments, the terminal apparatus 102 may be configured to operate as the main client device, and in other embodiments, the terminal apparatus 102 may be configured to operate as a supplementary client device (e.g., an external display device for providing expanded display to the main device). An example configuration for providing expanded display is illustrated in FIG. 7 and described in further detail below. In some embodiments, the configuration may be based at least in part on a Model-View-Controller (MVC) pattern, a Remote MVC pattern, and/or the like.

A terminal apparatus 102 may be embodied as any computing device, such as, for example, a desktop computer, laptop computer, mobile terminal, mobile computer, mobile phone, mobile communication device, tablet computing device, game device, digital camera/camcorder, audio/video player, television device, radio receiver, digital video recorder, positioning device, wrist watch, portable digital assistant (PDA), fixed transceiver device (e.g., attached to traffic lights, energy meters, light bulbs, and/or the like), a chipset, an apparatus comprising a chipset, any combination thereof, and/or the like.

Figure 2:
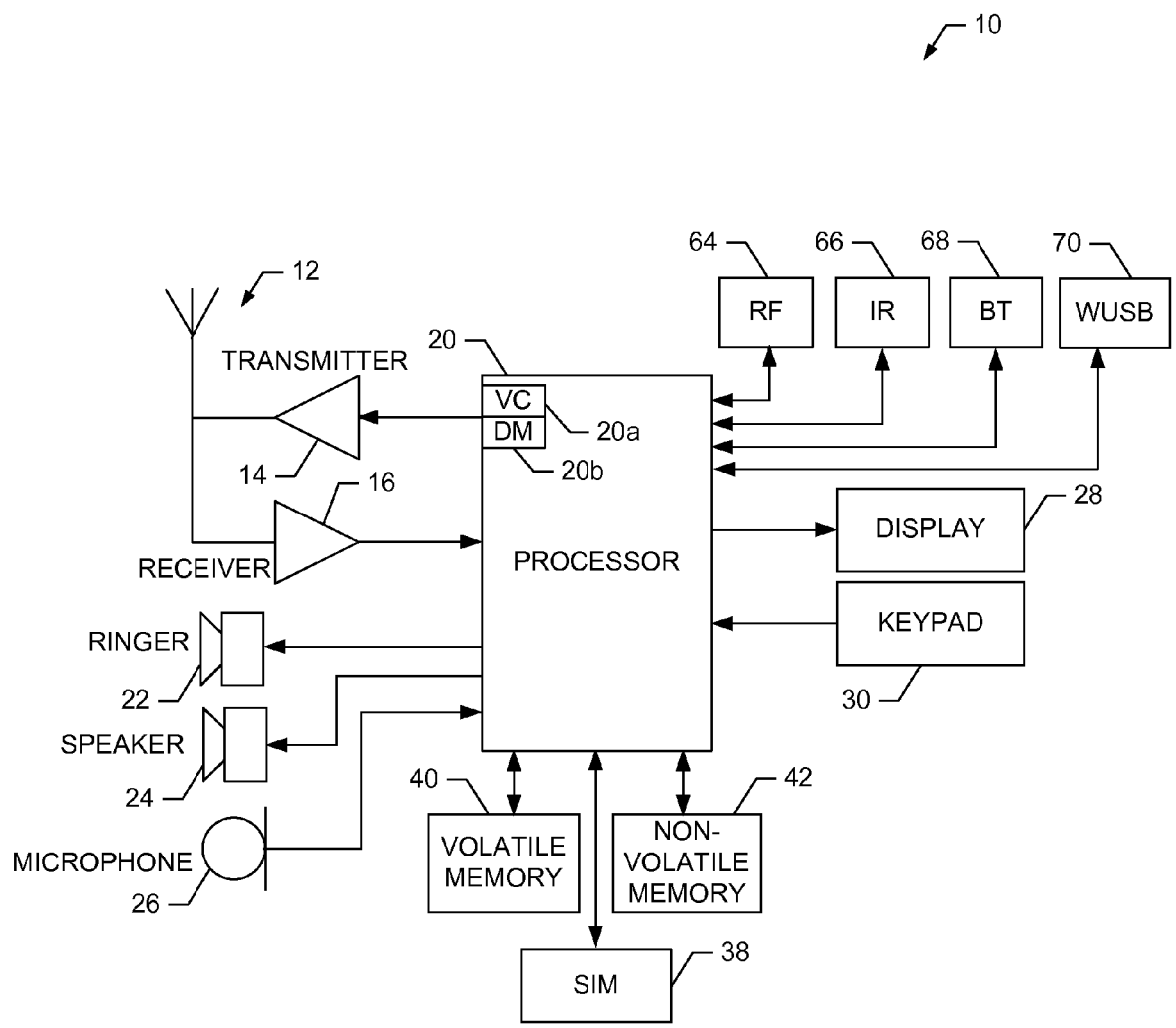
FIG. 2 illustrates a schematic block diagram of a mobile terminal according to some example embodiments of the present invention.

In some example embodiments, a terminal apparatus 102 may be embodied as a mobile terminal, such as that illustrated in FIG. 2. In this regard, FIG. 2 illustrates a block diagram of a mobile terminal 10 representative of one embodiment of a terminal apparatus 102. It should be understood, however, that the mobile terminal 10 illustrated and hereinafter described is merely illustrative of one type of computing device (i.e., terminal apparatus 102) that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some example embodiments the processor 20 may comprise a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Bluetooth™ (BT), Ultra-wideband (UWB), Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols such as LTE Advanced and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX™) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to low power/energy or ultra-low power/energy Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The mobile terminal 10 may comprise memory, such as a removable or non-removable subscriber identity module (SIM) 38, a soft SIM 38, a fixed SIM 38, a removable or non-removable universal subscriber identity module (USIM) 38, a soft USIM 38, a fixed USIM 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may comprise a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
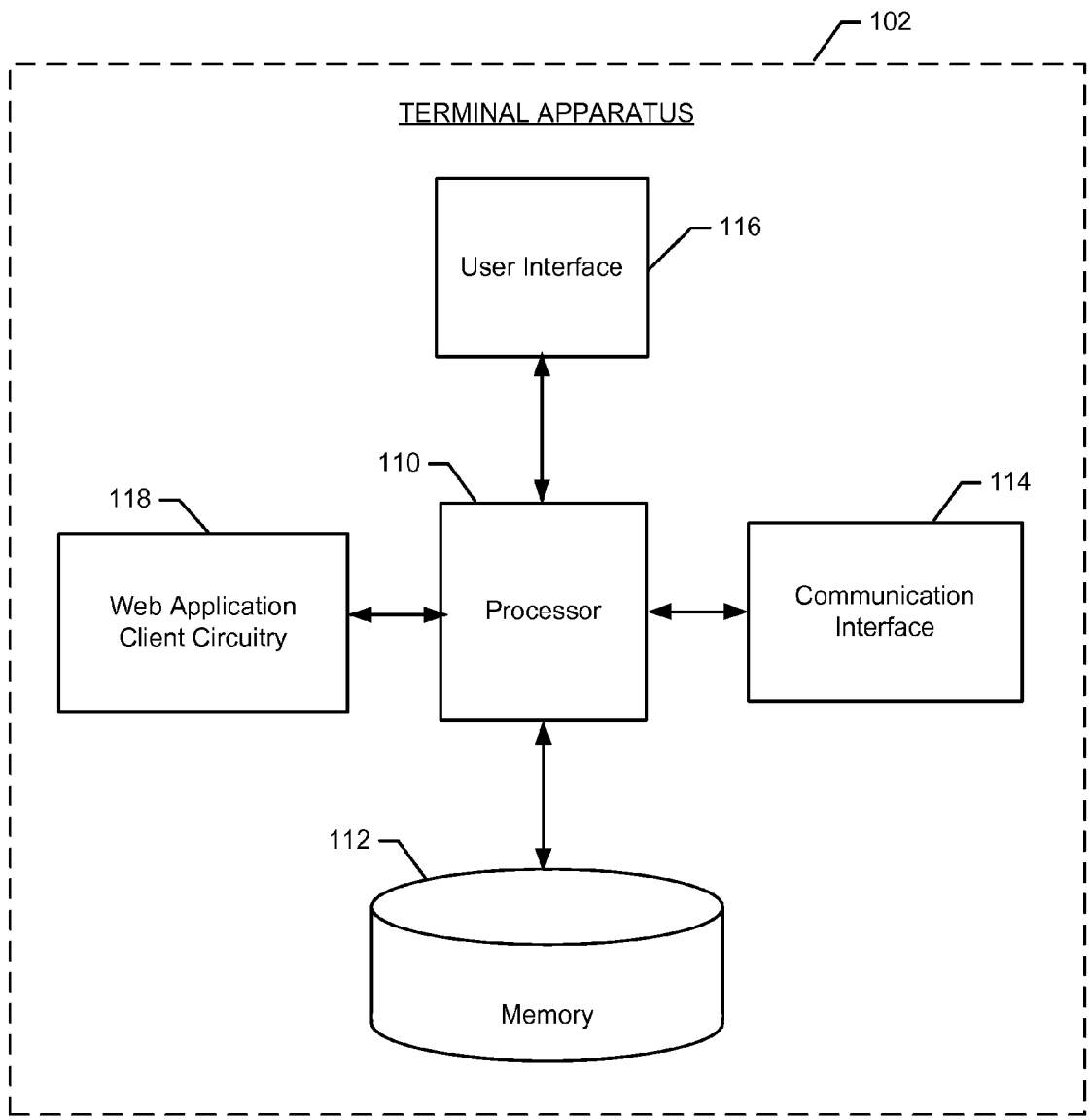
FIG. 3 illustrates a block diagram of a terminal apparatus according to some example embodiments of the present invention.

Referring now to FIG. 3, FIG. 3 illustrates a block diagram of a terminal apparatus 102 according to an example embodiment. In the example embodiment, the terminal apparatus 102 may comprise various means for performing the various functions herein described. These means may comprise one or more of a processor 110, memory 112, communication interface 114, user interface 116, or web application client circuitry 118. The means of the terminal apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (for example memory 112) that is executable by a suitably configured processing device (e.g., the processor 110), or some combination thereof.

In some example embodiments, one or more of the means illustrated in FIG. 3 may be embodied as a chip or chip set. In other words, the terminal apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 110, memory 112, communication interface 114, user interface 116, and/or web application client circuitry 118 may be embodied as a chip or chip set. The terminal apparatus 102 may therefore, in some example embodiments, be configured to implement embodiments of the present invention on a single chip or as a single "system on a chip." As another example, in some example embodiments, the terminal apparatus 102 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some embodiments the processor 110 may comprise a plurality of processors. The plurality of processors may be in operative communication with each other and may be collectively configured to perform one or more functionalities of the terminal apparatus 102 as described herein. The plurality of processors may be embodied on a single computing device or distributed across a plurality of computing devices collectively configured to function as the terminal apparatus 102. In embodiments wherein the terminal apparatus 102 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the terminal apparatus 102 to perform one or more of the functionalities of the terminal apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise one or more tangible and/or non-transitory computer-readable storage media that may include volatile and/or non-volatile memory. Although illustrated in FIG. 3 as a single memory, the memory 112 may comprise a plurality of memories. The plurality of memories may be embodied on a single computing device or may be distributed across a plurality of computing devices collectively configured to function as the terminal apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the terminal apparatus 102 is embodied as a mobile terminal 10, the memory 112 may comprise the volatile memory 40 and/or the non-volatile memory 42. The memory 112 may be configured to store information, data, applications, instructions, or the like for enabling the terminal apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. This stored information may be stored and/or used by the web application client circuitry 118 during the course of performing its functionalities.

The communication interface 114 may be embodied as any device or means embodied in circuitry, hardware, a computer program product comprising computer readable program instructions stored on a computer readable medium (for example, the memory 112) and executed by a processing device (for example, the processor 110), or a combination thereof that is configured to receive and/or transmit data from/to another computing device. In an example embodiment, the communication interface 114 may be at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the terminal apparatus 102 and one or more computing devices or computing resources may be in communication. As an example, the communication interface 114 may be configured to enable communication between the terminal apparatus 102 and another device, such as another terminal apparatus 102. As a further example, the communication interface 114 may be configured to enable communication with a serving network apparatus 104 via the network 106. The communication interface 114 may additionally be in communication with the memory 112, user interface 116, and/or web application client circuitry 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises a touch screen display, the user interface 116 may additionally be configured to detect and/or receive indication of a touch gesture or other input to the touch screen display. The user interface 116 may be in communication with the memory 112, communication interface 114, and/or web application client circuitry 118, such as via a bus.

The web application client circuitry 118 may be embodied as various means, such as circuitry, hardware, a computer program product comprising computer readable program instructions stored on a computer readable medium (for example, the memory 112) and executed by a processing device (for example, the processor 110), or some combination thereof and, in some embodiments, is embodied as or otherwise controlled by the processor 110. In embodiments wherein the web application client circuitry 118 is embodied separately from the processor 110, the web application client circuitry 118 may be in communication with the processor 110. The web application client circuitry 118 may further be in communication with one or more of the memory 112, communication interface 114, or user interface 116, such as via a bus.

Figure 4:
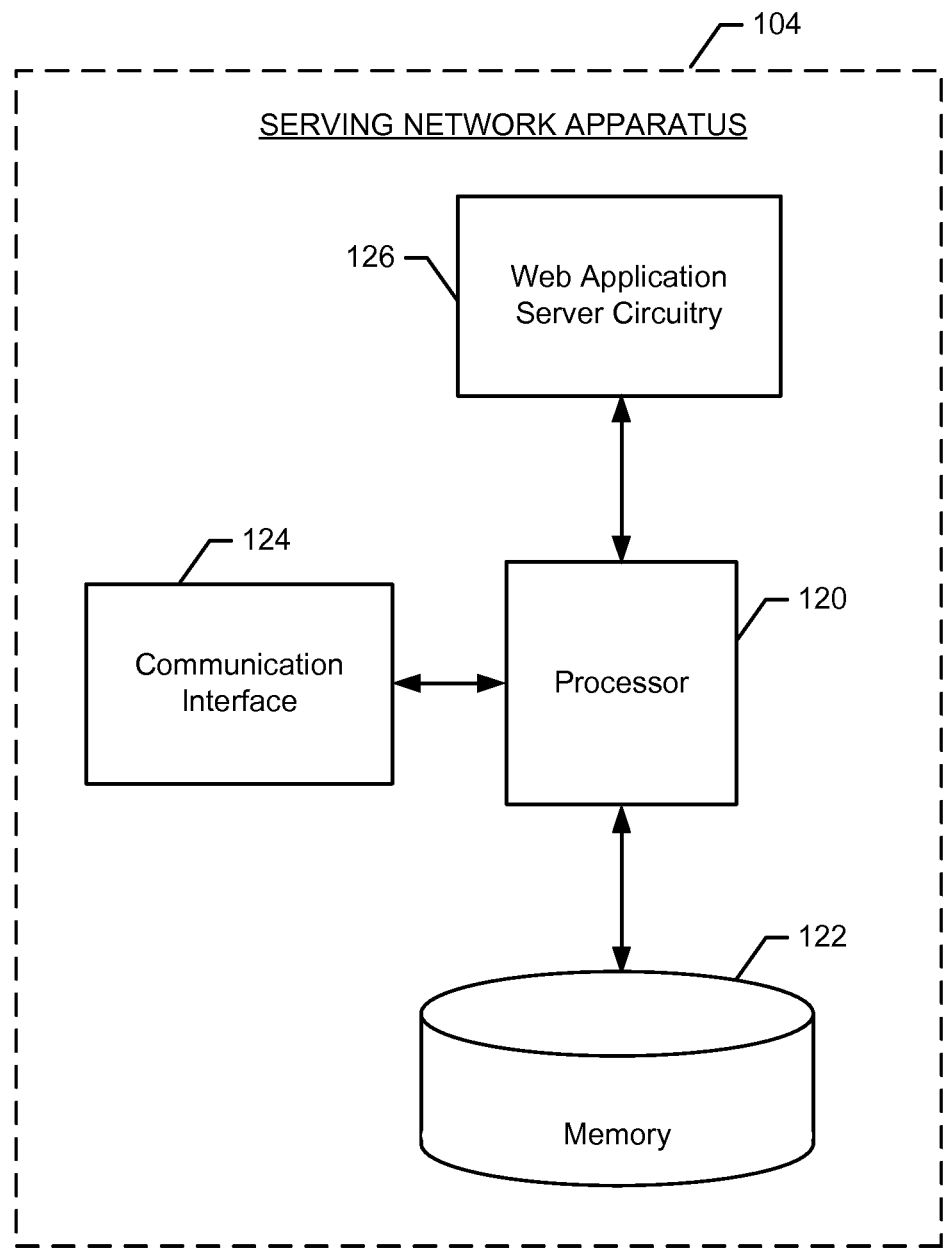
FIG. 4 illustrates a block diagram of a serving network apparatus according to some example embodiments of the present invention.

Referring now to FIG. 4, FIG. 4 illustrates a block diagram of a serving network apparatus 104 according to an example embodiment. In the example embodiment, the serving network apparatus 104 may comprise various means for performing the various functions herein described. These means may comprise one or more of a processor 120, memory 122, communication interface 124, or web application server circuitry 126. The means of the serving network apparatus 104 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., memory 122) that is executable by a suitably configured processing device (e.g., the processor 120), or some combination thereof.

In some example embodiments, one or more of the means illustrated in FIG. 4 may be embodied as a chip or chip set. In other words, the serving network apparatus 104 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 120, memory 122, communication interface 124, and/or web application server circuitry 126 may be embodied as a chip or chip set. The serving network apparatus 104 may therefore, in some example embodiments, be configured to implement embodiments of the present invention on a single chip or as a single "system on a chip." As another example, in some example embodiments, the serving network apparatus 104 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 4 as a single processor, in some embodiments the processor 120 may comprise a plurality of processors. The plurality of processors may be in operative communication with each other and may be collectively configured to perform one or more functionalities of the serving network apparatus 104 as described herein. The plurality of processors may be embodied on a single computing device or distributed across a plurality of computing devices collectively configured to function as the serving network apparatus 104. In some example embodiments, the processor 120 may be configured to execute instructions stored in the memory 122 or otherwise accessible to the processor 120. These instructions, when executed by the processor 120, may cause the serving network apparatus 104 to perform one or more of the functionalities of the serving network apparatus 104 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. In this regard, the memory 122 may comprise a non-transitory computer-readable storage medium. Although illustrated in FIG. 4 as a single memory, the memory 122 may comprise a plurality of memories. The plurality of memories may be embodied on a single computing device or may be distributed across a plurality of computing devices collectively configured to function as the serving network apparatus 104. In various example embodiments, the memory 122 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 122 may be configured to store information, data, applications, instructions, or the like for enabling the serving network apparatus 104 to carry out various functions in accordance with various example embodiments. For example, in some example embodiments, the memory 122 may be configured to buffer input data for processing by the processor 120. Additionally or alternatively, the memory 122 may be configured to store program instructions for execution by the processor 120. The memory 122 may store information in the form of static and/or dynamic information. This stored information may be stored and/or used by the web application server circuitry 126 during the course of performing its functionalities.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/to another computing device. In an example embodiment, the communication interface 124 may be at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more remote computing devices. The communication interface 124 may be configured to receive and/or transmit data using any protocol that may be used for communications between computing devices. In this regard, the communication interface 124 may be configured to receive and/or transmit data using any protocol that may be used for transmission of data over a wireless network, wireline network, some combination thereof, or the like by which the serving network apparatus 104 and one or more computing devices or computing resources may be in communication.

As an example, the communication interface 124 may be configured to enable communication with a terminal apparatus 102 by the network 106, a radio uplink, and/or the like. The communication interface 124 may additionally be in communication with the memory 122, and/or web application server circuitry 126, such as via a bus.

The web application server circuitry 126 may be embodied as various means, such as circuitry, hardware, a computer program product comprising computer readable program instructions stored on a computer readable medium (for example, the memory 122) and executed by a processing device (for example, the processor 120), or some combination thereof and, in some embodiments, is embodied as or otherwise controlled by the processor 120. In embodiments wherein the web application server circuitry 126 may be embodied separately from the processor 120, the web application server circuitry 126 may be in communication with the processor 120. The web application server circuitry 126 may further be in communication with one or more of the memory 122 or communication interface 124, such as via a bus.

According to various embodiments, the web application server circuitry 126 may be configured to receive a request for web content, for example a web application, from a terminal apparatus 102. The request may be received, in some embodiments, as an HTTP request from an application executing on the terminal apparatus 102 (e.g., a web browser). In this regard, the web application client circuitry 118 associated with the terminal apparatus 102 may be configured to transmit the request to the serving network apparatus 104 associated with the web application server circuitry 126.

In example embodiments, the web application server circuitry 126 may be configured to provide for distribution of the requested web content to the terminal apparatus 102. In this regard, the web application client circuitry 118 associated with the terminal apparatus 102 may be configured to receive the requested web content. The received web content may be associated with a web application configured to be displayed on multiple displays. That is, the web application associated with the received web content may be configured to be rendered across the displays of multiple terminal apparatuses 102.

In various embodiments, the web content associated with the web application may comprise a HyperText Markup Language (HTML) document identifying the layout of the web application. In this regard, the HTML layout document may identify and describe one or more frames corresponding to one or more respective portions of the display of the web application. For example, one frame may be associated with the main or central display of the web application, while other frames may be associated with expanded portions of the display positioned outside the main display area (e.g., above, below, to the left, to the right, or the like). The HTML layout document may indicate whether each frame is local (e.g., associated with the main display) or remote (e.g., associated with an external display). The HTML layout document, in some instances, may indicate the position (e.g., top, bottom, left, right) of a frame associated with an external display relative to the frame rendered on the main display. In certain embodiments, the terminal apparatus 102 associated with the web application client circuitry 118 initially requesting the web content associated with the web application may be designated as the main device (e.g., the main terminal apparatus 102) configured to render the frame associated with the local display.

According to example embodiments, the HTML layout document may provide information for accessing the frame of the web application to be rendered on the display (i.e., external or local display) associated with the frame. For example, the information may specify the source address for a separate HTML document for accessing the frame of the web application to be rendered on the display associated with the frame. In some instances, each frame may be associated with a separate portion of a single web application. For example, the single web application may provide separate outputs or feeds for each identified frame. In other embodiments, each frame may be associated with one of a plurality of web applications configured to appear to the end user as a single web application expanded across multiple displays. For example, a single web application may be divided into a plurality of web applications configured to provide the same functionality as the single web application while rendering only a particular frame of the display of the single web application.

In some embodiments, the web application client circuitry 118 associated with the terminal apparatus 102 configured to operate as the main device may send a request for the web application content (e.g., frame) associated with the local display. For example, the web application client circuitry 118 may be configured to access the HTML address (e.g., via a web browser) associated with the frame of the local display as identified in the HTML layout document. The web application server circuitry 126 of the serving network apparatus 104 receiving the request may be configured to provide the requested web content to the main device. In some instances, the web content provided by the web application server circuitry 126 may comprise a website for accessing the web application, a link to access the output of the web application associated with the frame of the local display, a link to download the web application, and/or the like.

According to various embodiments, the web application client circuitry 118 may be configured to render the local display for the web application. For example, the web application client circuitry 118 may be configured to render the local display using a web browser application. In some instances, the web application client circuitry 118 may be configured to execute the web application in order to determine the local display to render. In other embodiments, the web application client circuitry 118 may render the local display based on information (e.g., a feed) received from the web application executing on a serving network apparatus 104 (e.g., by the web application server circuitry 126).

In example embodiments, the web application client circuitry 118 may be configured to locate external devices (e.g., other terminal apparatuses 102) for expanding the display of the web application. In certain embodiments, any number of external devices may be used to expand the display; while in other embodiments, the number of external devices may depend on the configuration of the web application. In some instances, the web application client circuitry 118 may be configured to search for external devices proximate the terminal apparatus 102 associated with the web application client circuitry 118. For example, the web application client circuitry 118 may broadcast a message or signal requesting a connection from one or more external devices. In another example, the web application client circuitry 118 may be configured to execute software (e.g., Bonjour®) for locating and establishing a connection with neighboring external devices. The external devices may be connected to the same network (e.g., network 106) as or a neighboring network of the main device terminal apparatus 102, connected to the main device terminal apparatus 102 via an ad hoc network (e.g., a WLAN ad hoc network), connected directly to the main device terminal apparatus 102, not connected to any network, or the like. As noted above, the external device terminal apparatuses 102 may be embodied as any computing device, such as, for example, a desktop computer, laptop computer, mobile terminal, tablet computing device, and/or the like.

The web application client circuitry 118 associated with an external device terminal apparatus 102 may be configured to listen for connection requests from the main device terminal apparatus 102. In certain embodiments, the web application client circuitry 118 associated with an external device terminal apparatus 102 may receive the request (e.g., message or signal) from the main device terminal apparatus 102 and transmit a reply to the main device terminal apparatus 102 accepting or declining the request to connect. In some instances, the web application client circuitry 118 associated with an external device terminal apparatus 102 may require user input accepting or declining the request before transmitting the reply.

In example embodiments, the web application client circuitry 118 associated with the main device terminal apparatus 102 may establish a connection with the one or more external devices. In some instances, the web application client circuitry 118 associated with the main device terminal apparatus 102 may require user input authorizing the connections to the one or more external devices before establishing the connections. It should be appreciated that the embodiments described for establishing a connection should not be considered as limiting, and any method for establishing a connection between a main device terminal apparatus 102 and an external device terminal apparatus 102 may be used.

According to various embodiments, the web application client circuitry 118 associated with the main device terminal apparatus 102 and the web application client circuitry 118 associated with the external device terminal apparatus 102 may be configured to exchange information over the connection. For example, the information may comprise an indication of the position of the external display of the external device terminal apparatus 102 relative to the position of the local display of the main device terminal apparatus 102. In some embodiments, the web application client circuitry 118 associated with the main device terminal apparatus 102 may be configured to assign the position of the external display. In this regard, the web application client circuitry 118 associated with the main device terminal apparatus 102 may be configured to determine the position of the external device terminal apparatus 102. In some instances, the position may be determined by user input provided to the web application client circuitry 118, for example, in response to prompting the user of the main device to specify the relative location of the external device. In another instance, the main device may receive position information (e.g., GPS information) from the external device, which may be used to assign the position of the external display. In other embodiments, the web application client circuitry 118 of the external device terminal apparatus 102 may notify the main device terminal apparatus 102 of the relative position of the external device to the main device. For example, the web application client circuitry 118 of the external device may request and receive user input from a user of the external device specifying the relative location of the external device to the main device.

In some embodiments, the web application client circuitry 118 of the main device may be configured to provide the one or more connected external devices with information for accessing the web content for the respective external device. In this regard, once the main device has assigned a position (e.g., left, right, above, below) to the external device, the main device may provide an indication of the frame address for the particular position. In example instances, the main device may provide for transmission of the HTML layout document to the external device. In these instances, the web application client circuitry 118 of the external device terminal apparatus 102 may be configured to determine the information contained in the HTML layout document related to the frame to be displayed on the external display based at least in part on the position assigned by the main device. In other instances, the information provided by the main device may comprise the information from the HTML layout document specific to the frame associated with the position of the external display. For example, the information provided by the main device may specify the source address for a separate HTML document for accessing the frame of the web application to be rendered on the display associated with the external display.

According to various embodiments, the web application client circuitry 118 associated with the external device terminal apparatus 102 may send a request for the web application content (e.g., frame) associated with the external display. For example, the web application client circuitry 118 may be configured to access the HTML address (e.g., via a web browser) associated with the frame of the external display as identified in the HTML layout document or in the frame specific information provided by the main device. The web application server circuitry 126 of the serving network apparatus 104 receiving the request may be configured to provide the requested web content to the external device. In some instances, the web content provided by the web application server circuitry 126 may comprise a website for accessing the web application, a link to access the output of the web application associated with the frame of the external display, a link to download the web application, and/or the like.

According to various embodiments, the web application client circuitry 118 associated with the external device terminal apparatus 102 may be configured to render the external display for the web application. For example, the web application client circuitry 118 may be configured to render the frame associated with the particular external display using a web browser application. In some instances, the web application client circuitry 118 may be configured to execute the web application in order to determine the external display to render. In other embodiments, the web application client circuitry 118 may render the external display based on information (e.g., a feed) received from the web application executing on a serving network apparatus 104 (e.g., by the web application server circuitry 126).

In other embodiments, the web application client circuitry 118 associated with either the main device terminal apparatus 102 may be configured to receive the web content associated with all of the frames of the web application. In these embodiments, the main device may be configured to provide the web content associated with the external frames to the one or more external devices.

In example embodiments, the web application client circuitry 118 associated with either the main device or one of the one or more external devices may be configured to receive user input associated with the frame of the web application rendered on the display of the respective device. In this regard, the web application client circuitry 118 may provide a user interface as part of the frame of the web application displayed. In an example instance, a user of the main or an external device may manipulate the display associated with the frame rendered on that particular display. As a result, the frames rendered on the other devices configured to display a frame of the web application may similarly have the display manipulated on the respective frame displayed. For example, in an instance in which the web application provides for rendering a panorama image across the displays of the multiple devices, when a user manipulates the display on a particular device (e.g., scrolls the panorama to the left) the displays on the remaining devices may be similarly manipulated (e.g., also scrolled to the left) automatically by the web application (e.g., via the feed provided for the frame displayed by the particular device). In this regard, once the plurality of display devices are connected, configured by position, and displaying the web content associated with each respective frame of the web application, the user input provided to the web application client circuitry 118 of any of the plurality of display devices may affect the display of all of the plurality of display devices. That is, all of the display devices may be configured to act in unison to render and update an expanded display associated with the web application across the multiple display devices regardless of which display device receives the user input.

According to various embodiments, the connection between the main device and/or one or more external devices with the web server may comprise a socket connection, long polling connection, asynchronous connection, and/or the like. In this regard, the main device and one or more external devices may be configured to receive automatic updates from the web server as needed without requiring the device to send additional requests to the web server.

Figure 6:
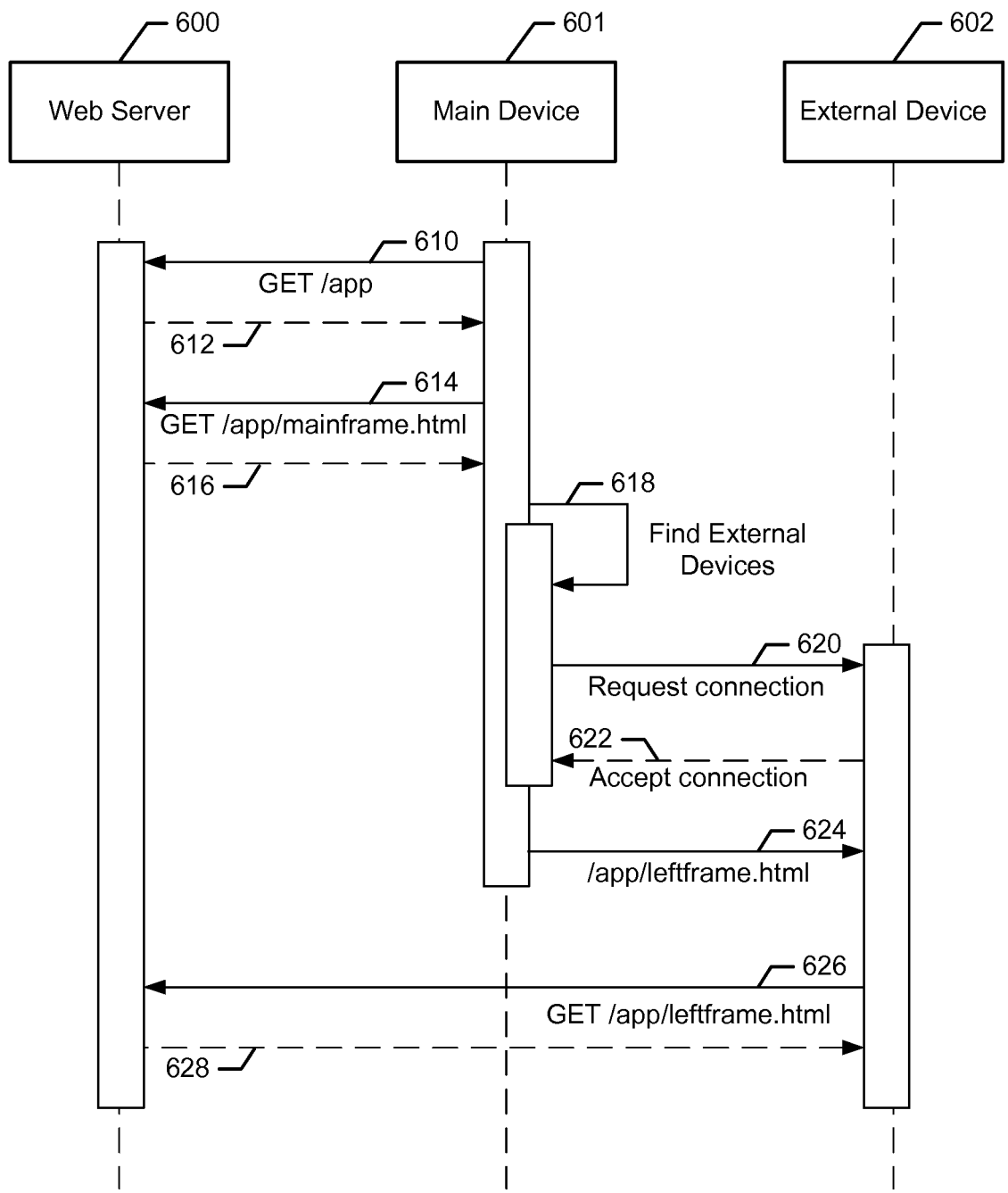
FIG. 6 illustrates an example interaction pattern according to an example embodiment for expanding the display of a web application across multiple devices.

FIG. 6 illustrates an example interaction pattern between a web server 600 serving a web application, a main device 601, and an external device 602. The example interaction depicts actions that may be taken or messages that may be sent according to an example embodiment for establishing, displaying, and controlling a web application using a display expanded across multiple devices. In this example interaction, the web server 600 may be embodied as a serving network apparatus 104 comprising web application server circuitry 126, and the main and external devices 601, 602 may be embodied as terminal apparatuses 102 comprising web application client circuitry 118. It should be understood that many variations to the structure and content of the example representation of FIG. 6 may be made without departing from the scope of the present invention.

In the example interaction, the main device 601 may initially send a request at operation 610 for a web application (i.e., GET /app) to the web server 600. For example, the web application may be a photo viewing application for panoramic images. The web server 601 may reply by transmitting an HTML layout document at operation 612 to the main device 601. The main device 601, in this example, may parse the HTML layout document to determine the address for accessing the frame of the web application to be displayed on the main device 601. In this example interaction the address for the frame to be displayed on the main device 601 may be comprise a web page for accessing the frame (i.e., /app/mainframe.html). The main device 601 may then send a request at operation 614 to the web server 600 for the web content for the determined frame. The web server 601 may again respond at operation 616 by providing the web content for the frame, for example by providing the web application for providing the main device frame content to be executed on the main device 601.

According to the example shown in FIG. 6, the process may continue by the main device 601 attempting to find external devices 602 on which to expand the display of the web application at operation 618. The main device 601 may continue searching until one or more external devices 602 are found. In the example interaction, the main device 601 locates the external device 602 and sends a request for connection at operation 620 to which the external device 602 responds by accepting the connection at operation 622. The main device

601 then assigns a position to the display of the external device (i.e., left) and determines the address for accessing the frame of the web application to be displayed on the external device 602 (i.e., /app/leftframe.html). The main device 601 transmits to the external device 602 an indication of the address for accessing the frame to be displayed on the external device at operation 624. The external device 602, after receiving the address for the frame of the web application to be displayed, sends a request to the web server 600 at operation 626 for the web content associated with the external frame address. The web server 600 may respond to the external device 602 by providing the web content for the external frame at operation 628, for example by providing the web application for providing the external device frame content to be executed on the external device 602.

Although the example interaction of FIG. 6 depicts two user devices, namely the main device 601 and a single external device 602, it should be appreciated that any number of external devices 602 may be used to expand the display of the web application.

FIG. 7 illustrates an example configuration of a web server serving a web application, a main device, and an external device according to an embodiment of the present invention. As shown in FIG. 7, the main device 702 may request the web application from the web server 700 over connection 712. The main device 702 may receive a layout of the web application display indicating the main frame 722, left frame 724, and right frame 726. The main device 702 may request and receive the web application content for the main frame 722 from the web server 700 over connection 712. The main device 102 may then locate and connect to left device 704 and right device 706 over connections 714 and 716, respectively. In this example, the main device 702 may send the address associated with the left frame 724 of the web application to left device 704 over connection 714 and may send the address associated with the right frame 726 of the web application to right device 706 over connection 716. The left device 704 and right device 706 then may request and receive the web application content for the left frame 724 and right frame 726, respectively, over connections 734 and 736, respectively. The left device 704 may then display the rendered left frame 744 on the display of the left device 704, and right device 706 may then display the rendered right frame 746 on the display of the right device 706.

Figure 5:
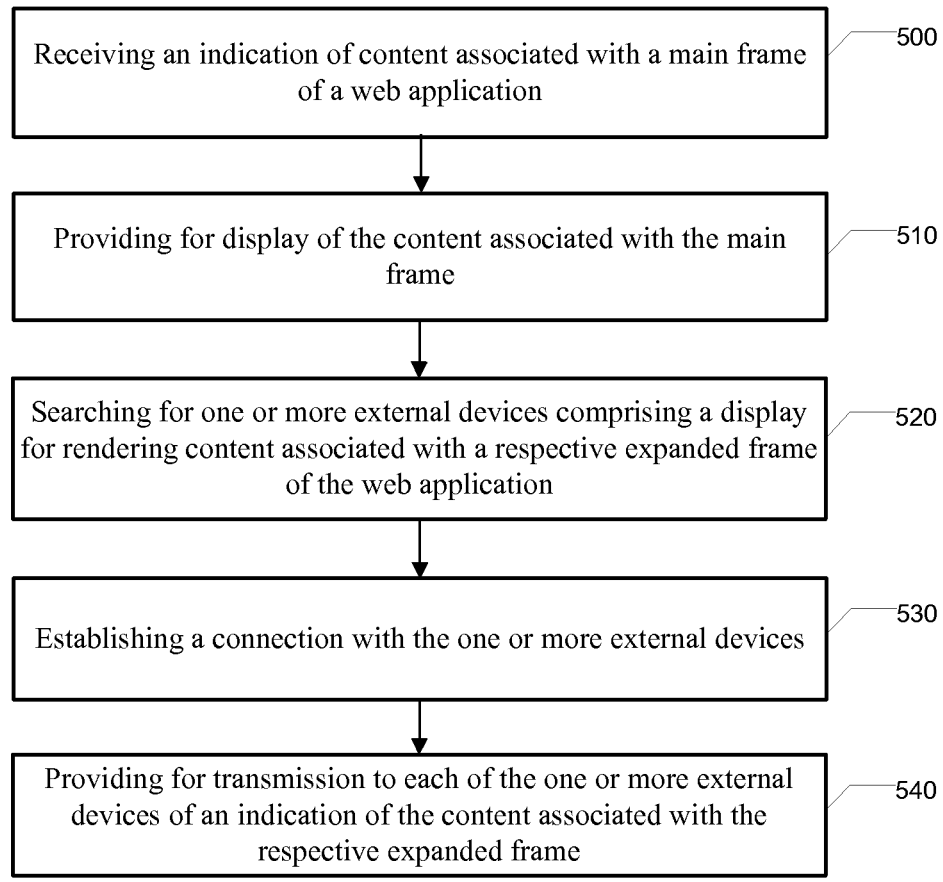
FIG. 5 illustrates a flowchart according to an example method for expanding the display of a web application across multiple devices according to some example embodiments of the present invention.

Returning to FIG. 5, FIG. 5 illustrates a flowchart according to an example method for expanding the display of a web application across multiple devices. In this regard, FIG. 5 illustrates operations that may be performed at a terminal apparatus 102. The operations illustrated in and described with respect to FIG. 5 may, for example, be performed by, with the assistance of, and/or under the control of one or more of the processor 110, memory 112, communication interface 114, or web application client circuitry 118. Operation 500 may comprise receiving an indication of content associated with a main frame of a web application. The processor 110, memory 112, communication interface 114, user interface 116, and/or web application client circuitry 118 may, for example, provide means for performing operation 500. Operation 510 may comprise providing for display of the content associated with the main frame. The processor 110, memory 112, communication interface 114, user interface 116, and/or web application client circuitry 118 may, for example, provide means for performing operation 510. Operation 520 may comprise searching for one or more external devices. Each of the one or more external devices may comprise a display for rendering content associated with a respective expanded frame of the web application. The processor 110, memory 112, communication interface 114, user interface 116, and/or web application client circuitry 118 may, for example, provide means for performing operation 520. Operation 530 may comprise establishing a connection with the one or more external devices. The processor 110, memory 112, communication interface 114, user interface 116, and/or web application client circuitry 118 may, for example, provide means for performing operation 530. Operation 540 may comprise providing for transmission to each of the one or more external devices of an indication of the content associated with the respective expanded frame. The processor 110, memory 112, communication interface 114, user interface 116, and/or web application client circuitry 118 may, for example, provide means for performing operation 540

FIG. 5 illustrates a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums (as opposed to a computer-readable transmission medium which describes a propagating signal) having one or more computer program code instructions, program instructions, or executable computer-readable program code instructions stored therein. For example, one or more of the procedures described herein may be embodied by computer program instructions of a computer program product. In this regard, the computer program product(s) that embodies the procedures described herein may be stored by one or more memory devices (e.g., memory 122, volatile memory 40, or non-volatile memory 42) of a mobile terminal, server, or other computing device (e.g., the terminal apparatus 102) and executed by a processor (e.g., the processor 120 or processor 20) in the computing device. In some embodiments, the computer program instructions comprising the computer program product(s) that embodies the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s).

Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together.

Accordingly, execution of instructions associated with the operations of the flowchart by a processor, or storage of instructions associated with the blocks or operations of the flowchart in a computer-readable storage medium, support combinations of operations for performing the specified functions. It will also be understood that one or more operations of the flowchart, and combinations of blocks or operations in the flowchart, may be implemented by special purpose hardware-based computer systems and/or processors which perform the specified functions, or combinations of special purpose hardware and program code instructions.

The above described functions may be carried out in many ways. For example, any suitable means for carrying out each of the functions described above may be employed to carry out embodiments of the invention. In example embodiments, a suitably configured processor (for example, the processor 110 and/or processor 120) may provide all or a portion of the elements of the invention. In other embodiments, all or a portion of the elements of the invention may be configured by and operate under control of a computer program product. The computer program product for performing the methods of embodiments of the invention may comprise a computer-readable storage medium, such as the non-volatile storage medium (for example, the memory 112 and/or memory 122), and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
    receiving an indication of content associated with a main frame of a web application, wherein the main frame of the web application corresponds to a main display area of a display of the web application;
    providing for display of the content associated with the main frame;
    searching, by a processor, for one or more external devices, wherein each of the one or more external devices comprises a display for rendering content associated with a respective expanded frame of the web application, wherein the respective expanded frame of the web application corresponds to a portion of the display of the web application that is positioned outside the main display area;
    establishing, by the processor, a connection with the one or more external devices; and
    providing for transmission to each of the one or more external devices of an indication of the content associated with the respective expanded frame.

2. The method of claim 1, further comprising:
    assigning a position to each of the one or more external devices, wherein the position provides an indication of a location relative to the main frame of the respective expanded frame to be displayed on the external device.

3. The method of claim 2, wherein assigning the position is based at least in part on a physical location of the external device.

4. The method of claim 1, further comprising:
    providing for transmission of a request for the web application;
    receiving information for accessing the web application;
    determining an address for accessing the content associated with the main frame of the web application; and
    providing for transmission of a request for the content associated with the main frame.

5. The method of claim 4, wherein the information for accessing the web application comprises at least one of an indication of the address for accessing the content associated with the main frame of the web application and one or more addresses for accessing the content associated with one or more expanded frames of the web application.

6. The method of claim 1, further comprising:
    receiving user input manipulating the display of the main frame of the web application;
    updating the display of the main frame based at least in part on the user input, wherein updating the display of the main frame causes updating of the display of one or more expanded frames of the web application.

7. The method of claim 1, wherein searching for one or more external devices further comprises:
    broadcasting a request for external devices comprising a display;
    receiving a response from one or more external devices, wherein the response comprises an indication of acceptance of the request.

8. An apparatus comprising:
    at least one processor, and
    at least one memory comprising computer program code, the at least one memory and the computer program code configured to, with the at least one processor, cause the apparatus at least to:
        receive an indication of content associated with a main frame of a web application, wherein the main frame of the web application corresponds to a main display area of a display of the web application;
        provide for display of the content associated with the main frame;
        search for one or more external devices, wherein each of the one or more external devices comprises a display for rendering content associated with a respective expanded frame of the web application, wherein the respective expanded frame of the web application corresponds to a portion of the display of the web application that is positioned outside the main display area;
        establish a connection with the one or more external devices; and
        provide for transmission to each of the one or more external devices of an indication of the content associated with the respective expanded frame.

9. The apparatus of claim 8, wherein the at least one memory and the computer program code are further configured to, with the at least one processor, cause the apparatus to:

assign a position to each of the one or more external devices, wherein the position provides an indication of a location relative to the main frame of the respective expanded frame to be displayed on the external device.

10. The apparatus of claim 9, wherein assigning the position is based at least in part on a physical location of the external device.

11. The apparatus of claim 8, the at least one memory and the computer program code further configured to, with the at least one processor, cause the apparatus to:
provide for transmission of a request for the web application;
receive information for accessing the web application;
determine an address for accessing the content associated with the main frame of the web application; and
provide for transmission of a request for the content associated with the main frame.

12. The apparatus of claim 11, wherein the information for accessing the web application comprises at least one of an indication of the address for accessing the content associated with the main frame of the web application and one or more addresses for accessing the content associated with one or more expanded frames of the web application.

13. The apparatus of claim 8, wherein the at least one memory and the computer program code are further configured to, with the at least one processor, cause the apparatus to:
receive user input manipulating the display of the main frame of the web application;
update the display of the main frame based at least in part on the user input, wherein updating the display of the main frame causes the display of the one or more expanded frames of the web application.

14. The apparatus of claim 8, wherein in order to search for one or more external devices, the at least one memory and the computer program code are further configured to, with the at least one processor, cause the apparatus to:
broadcast a request for external devices comprising a display;
receive a response from one or more external devices, wherein the response comprises an indication of acceptance of the request.

15. A computer program product comprising at least one non-transitory computer readable medium having program code stored thereon, wherein the program code, when executed by an apparatus, causes the apparatus at least to:
receive an indication of content associated with a main frame of a web application, wherein the main frame of the web application corresponds to a main display area of a display of the web application;
provide for display of the content associated with the main frame;
search for one or more external devices, wherein each of the one or more external devices comprises a display for rendering content associated with a respective expanded frame of the web application, wherein the respective expanded frame of the web application corresponds to a portion of the display of the web application that is positioned outside the main display area;
establish a connection with the one or more external devices; and
provide for transmission to each of the one or more external devices of an indication of the content associated with the respective expanded frame.

16. The computer program product of claim 15, wherein the program code, when executed by the apparatus, further causes the apparatus at least to:
assign a position to each of the one or more external devices, wherein the position provides an indication of a location relative to the main frame of the respective expanded frame to be displayed on the external device.

17. The computer program product of claim 16, wherein assigning the position is based at least in part on a physical location of the external device.

18. The computer program product of claim 15, wherein the program code, when executed by the apparatus, further causes the apparatus at least to:
provide for transmission of a request for the web application;
receive information for accessing the web application;
determine an address for accessing the content associated with the main frame of the web application; and
provide for transmission of a request for the content associated with the main frame.

19. The computer program product of claim 18, wherein the information for accessing the web application comprises at least one of an indication of the address for accessing the content associated with the main frame of the web application and one or more addresses for accessing the content associated with one or more expanded frames of the web application.

20. The computer program product of claim 15, wherein the program code, when executed by the apparatus, further causes the apparatus at least to:
receive user input manipulating the display of the main frame of the web application;
update the display of the main frame based at least in part on the user input, wherein updating the display of the main frame causes the display of the one or more expanded frames of the web application.

21. The computer program product of claim 15, wherein the program code that causes the apparatus to search for one or more external devices, when executed by the apparatus, further causes the apparatus at least to:
broadcast a request for external devices comprising a display,
receive a response from one or more external devices, wherein the response comprises an indication of acceptance of the request.

22. An apparatus comprising:
means for receiving an indication of content associated with a main frame of a web application, wherein the main frame of the web application corresponds to a main display area of a display of the web application;
means for providing for display of the content associated with the main frame;
means for searching for one or more external devices, wherein each of the one or more external devices comprises a display for rendering content associated with a respective expanded frame of the web application, wherein the respective expanded frame of the web application corresponds to a portion of the display of the web application that is positioned outside the main display area;
means for establishing a connection with the one or more external devices; and
means for providing for transmission to each of the one or more external devices of an indication of the content associated with the respective expanded frame.

23. The apparatus of claim 22, further comprising:
means for assigning a position to each of the one or more external devices, wherein the position provides an indication of a location relative to the main frame of the respective expanded frame to be displayed on the external device.

24. The apparatus of claim 23, wherein assigning the position is based at least in part on a physical location of the external device.

25. The apparatus of claim 22, further comprising:
means for providing for transmission of a request for the web application;
means for receiving information for accessing the web application;
means for determining an address for accessing the content associated with the main frame of the web application; and
means for providing for transmission of a request for the content associated with the main frame.

26. The apparatus of claim 25, wherein the information for accessing the web application comprises at least one of an indication of the address for accessing the content associated with the main frame of the web application and one or more addresses for accessing the content associated with one or more expanded frames of the web application.

27. The apparatus of claim 22, further comprising:
means for receiving user input manipulating the display of the main frame of the web application;
means for updating the display of the main frame based at least in part on the user input, wherein updating the display of the main frame causes updating of the display of one or more expanded frames of the web application.

28. The apparatus of claim 22, wherein means for searching for one or more external devices further comprises:
means for broadcasting a request for external devices comprising a display;
means for receiving a response from one or more external devices, wherein the response comprises an indication of acceptance of the request.

* * * * *